United States Patent [19]

Kim et al.

[11] Patent Number: 4,809,279
[45] Date of Patent: * Feb. 28, 1989

[54] ENHANCED PARITY DETECTION FOR WIDE ROM/PROM MEMORY STRUCTURE

[75] Inventors: Dongsung R. Kim, Laguna Hills; Reinhard K. Kronies, Fountain Valley, both of Calif.

[73] Assignee: Unisys Corporation, Blue Bell, Pa.

[*] Notice: The portion of the term of this patent subsequent to Dec. 1, 2004 has been disclaimed.

[21] Appl. No.: 904,443

[22] Filed: Sep. 8, 1986

[51] Int. Cl.$^4$ ............................................. G06F 11/10
[52] U.S. Cl. ....................................................... 371/51
[58] Field of Search ...................... 371/49, 51; 365/201

[56] References Cited

U.S. PATENT DOCUMENTS

| | | | |
|---|---|---|---|
| 3,789,204 | 1/1974 | Barlow | 371/51 |
| 3,944,800 | 3/1976 | Beck et al. | 371/51 |
| 4,016,409 | 4/1977 | Kim | 371/51 |
| 4,019,033 | 4/1977 | Parmet | 371/51 |
| 4,271,521 | 6/1981 | Mahmood | 371/51 |
| 4,295,219 | 10/1981 | Draper et al. | 371/51 |
| 4,355,393 | 10/1982 | Kubo et al. | 371/51 |
| 4,453,251 | 6/1984 | Osman | 371/51 |
| 4,464,755 | 8/1984 | Stewart et al. | 371/51 |
| 4,612,640 | 9/1986 | Mehrotca et al. | 371/51 |

OTHER PUBLICATIONS

Sellers et al., Error Detecting Logic for Digital Computers, McGraw Hill, New York, 1968, pp. 207–211.

*Primary Examiner*—Charles E. Atkinson
*Attorney, Agent, or Firm*—Alfred W. Kozak; Nathan Cass; Kenneth L. Miller

[57] ABSTRACT

A wide ROM-PROM memory is structured of multiple memory chips in parallel plus an auxiliary parity memory chip to hold parity bits for each corresponding addressable location in each memory chip. Sensing means is provided to check parity of data bits read from each memory location to verify integrity of the read-out.

12 Claims, 1 Drawing Sheet

ENHANCED PARITY DETECTION FOR WIDE ROM/PROM MEMORY STRUCTURE

FIELD OF THE INVENTION

This disclosure relates to circuitry in systems for proving out data transfer integrity when data bits are placed in a programmed memory (ROM) having a wide memory structure.

CROSS REFERENCES TO RELATED PATENT APPLICATIONS

This disclosure is related to certain other patent applications assigned to the same assignee and developed by the same inventors. These are:

Specialized Parity Detection System For Wide Memory Structures, inventors Dongsung Kim and Reinhard K. Kronies, filed on Apr. 21, 1986 in the U.S. Patent Office as U.S. Ser. No. 854,232.

"Parity Detection System for Wide Bus Circuitry", inventors Dongsung R. Kim and Reinhard K. Kronies, filed on Apr. 4, 1986 as U.S. Ser. No. 848,073, which issued as U.S. Pat. No. 4,710,935 on Dec. 1, 1987.

BACKGROUND OF THE INVENTION

Many types of memory chip structures are used in the course of digital circuitry, the simplest memory structure of which is when the memory chips are merely 1-bit wide. For example, a memory with organization such as a 4K by 1 represents a situation here the memory structure is 1-bit wide and the memory unit can store 4,092 bits of memory, and each individual bit-space can be addressed in order to output the particular data bit which resides in that memory space.

The conventional parity check detection circuitry which is used for such a memory structure (which is made up of 1-bit wide memory chips) is provided by adding a single parity bit to each word wherein the parity bit is stored into the memory together with the written-in word during the Write time. Subsequently, when the particular word and its parity bit is read out, then a new parity check is accomplished by checking the parity for the particular word that was read out during the Read time.

This scheme works adequately as long as the memory chips used are merely 1-bit wide in their organization, since in this case, any single chip failure would result in a single bit failure and thus be detected by the Read-out of the word and its parity bit.

However, increasingly today, the memory chips used in memory structure are organized according to multi-bit widths, such as 1K by 4. Under these conditions, the normal detection scheme of adding a parity bit to the writing of a wide word and then detecting the parity bit after the reading out of the word, would cause this system to miss many single chip failures since this can result in a "no failure" to a "4-bit failure".

Since the memory structures used very often consist of multi-bit width memory chips, as for example in such designs as control stores and look-up tables, it is most desirable to have more parity detection coverage to overcome the inadequacies inherent in the prior types of parity checking.

SUMMARY OF THE INVENTION

Figure 1:
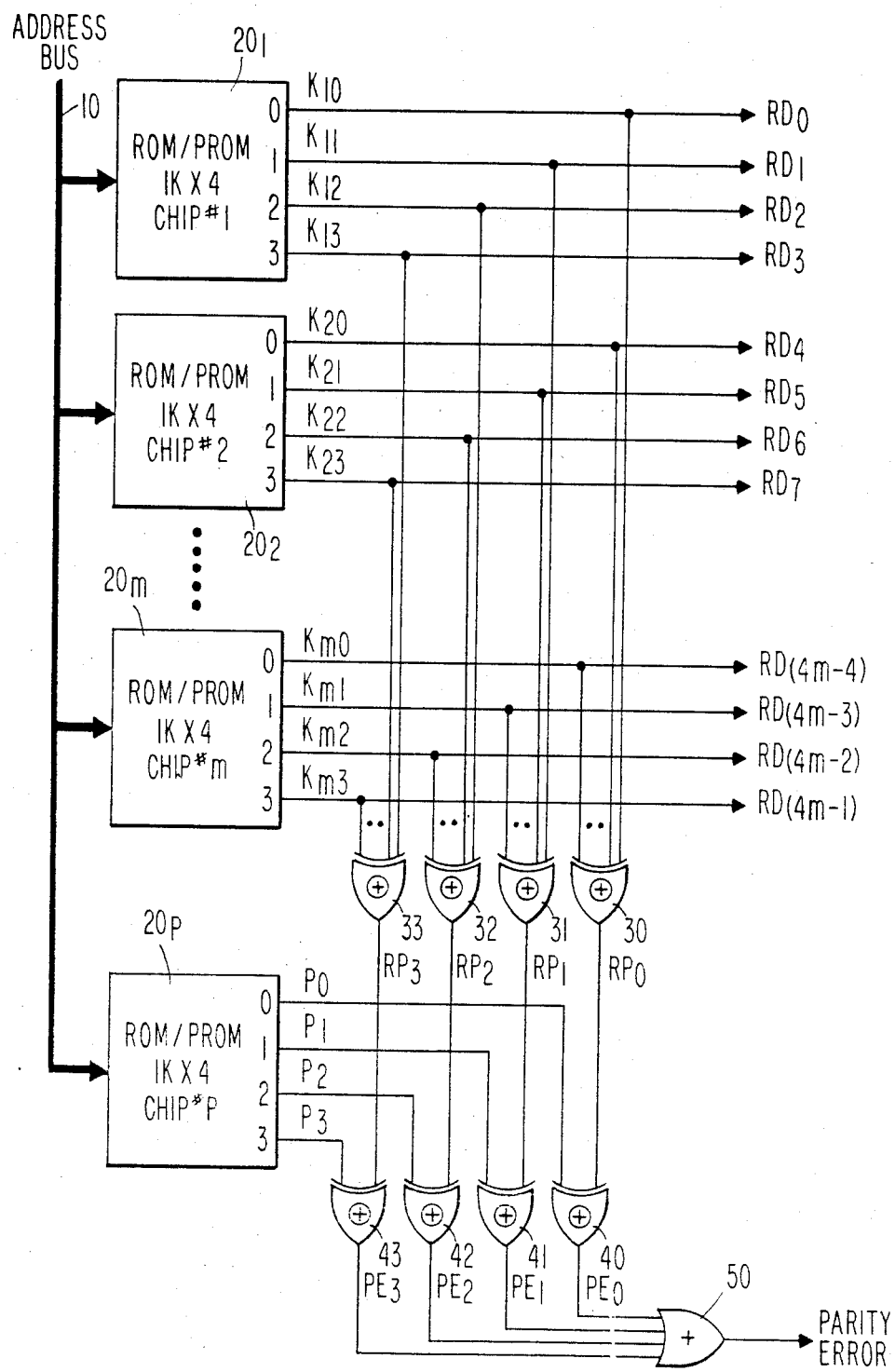
FIG. 1 is a block diagram of the parity detection scheme as applied to a programmed memory such as a read only memory (ROM) or programmable read only memory (PROM).

The system and circuitry disclosed herein operates to generate multiple parity bits for each data word, said parity bits being equal to the width of bits in each of the memory chips used. Thus, parity bits are generated as follows: a parity bit 0, which is designated as $P_O$, is the parity sum of all the bit position 0's of each memory chip which carry portions of the word addressed.

Similarly, a parity bit 1 designated $P_1$ is the parity sum of all the bit position 1's of each of the memory chips carrying the word.

Subsequently, the parity bit n designated as $P_n$ is the parity sum of all the bit position n's of each of the memory chips carrying the word where n is the width of bits of the word which is carried by each memory chip.

These parity bits are then appended to each word at the time of generating the ROM mask pattern or at the time of programming the programmable memory involved.

When an addressed word is read out during the Read operation, then the parity bits for the read-out data will be generated by implementing the logic by duplicating the equation which generated the programmed parity bit previously inserted.

Then each of these parity bits is compared separately, bit-to-bit, with the corresponding pre-programmed parity bits which were read out. The outputs of the comparison gates (Exclusive OR gates) are logically ORed in order to indicate whether or not there was a parity error in the word that was read.

This system insures that any single chip failure will be detected as a parity error in each case, thus enhancing the discovery of data transfer errors.

DESCRIPTION OF A PREFERRED EMBODIMENT

As seen in .FIG. 1, there is provided a series of ROM or PROM chips which are designated as $20_1$, $20_2$, ---$20_m$ and parity chip $20_p$ to indicate the existence of a memory structure which is basically composed of m chips and to which is added an additional parity chip designated as $20_p$.

Each of these memory chips is addressed by an address bus 10 and this includes the additional parity chip $20_p$.

The output lines from each ROM chip will be seen to consist of 4 output lines since the chip is 4 bits wide, and in this described embodiment has 1,024 locations each of 4 bits wide. Each of these 1,024 locations can be addressed in order to read out 4 bits of data on the 4 output lines on any given Read cycle. The output read-out lines are designated as $RD_0$, $RD_1$, $RD_2$, $RD_3$, etc as seen in FIG. 1.

The immediate outputs of the first ROM/PROM chip $20_1$ are designated as $K_{10}$, $K_{11}$, $K_{12}$ and $K_{13}$; the immediate outputs of ROM/PROM chip $20_2$ are labelled $K_{20}$, $K_{21}$, $K_{22}$ and $K_{23}$.

Similarly, the outputs of the chip number "m" will be seen to have the output lines designated as $K_{m0}$, $K_{m1}$, $K_{m2}$, and $K_{m3}$.

In FIG. 1, the Read Output Lines from the chip $20_m$ are shown labelled as $RD_{(4m-2)}$, $RD_{(4m-3)}$, $RD_{(4m-2)}$, $RD_{(4m-1)}$. Thus if m=10 (representing the 10th chip) then these Read Output Lines would be $RD_{36}$, $RD_{37}$, $RD_{38}$, and $RD_{39}$.

In FIG. 1, the immediate outputs of the parity chip $20_p$ are shown designated as $P_0, P_1, P_2,$ and $P_3$.

The extended Read outputs of each of these ROMs/PROMs are "RD" designated as shown where chip $20_1$ has Read outputs designated as $RD_0$, $RD_1$, $RD_2$ and $RD_3$.

As will be seen in FIG. 1, the "0" output of each of the chips is connected to an Exclusive OR gate 30 having an output designated $RP_0$. Likewise, the "1" bit output of each of the ROMs/PROMs is connected to feed the Exclusive OR gate 31 having an output line designated $RP_1$.

The "2" bit output lines of each of the ROM/PROM chips is connected to the Exclusive OR gate 32 to provide an output designated $RP_2$, while each of the "3" bit output lines of each of the memory chips is fed to the Exclusive OR gate 33 having an output designated as $RP_3$.

Additionally, this scheme now provides another set of Exclusive OR gates designated 40, 41, 42 and 43, which accept the respective 0, 1, 2, 3, bit line outputs ($P_0$, $P_1$, $P_2$, $P_3$) of the ROM/PROM chip $20_p$ in addition to accepting as input the outputs of the gates 30 thru 33 respectively.

Thus, each output of the gates 40 thru 43 then provide parity error output signals which are designated as $PE_0$, $PE_1$, $PE_2$, and $PE_3$. Each output of each of the gates 40 through 43 provides the inputs to the OR gate 50 which will provide a parity error signal should any one of the inputs to gate 50 be true.

In this situation of a wide structured ROM/PROM memory structure, the parity bits are programmed into each addressed location in order to provide a parity bit for each particular programmed word that was inserted into the memory structure.

As a result of this arrangement of the program parity bits, the following operational equations will reflect the use of these parity bits in the parity detection scheme and circuitry which provide for the detection of any single bit failure. Thus, where $\oplus$ represents the Exclusive "OR" operation, the logic equations at the bottom of FIG. 1 will indicate how each parity bit signal ($P_0$, $P_1$, $P_2$, $P_3$) should correlate with the corresponding K output signals from each ROM/PROM chip.

As indicated at the bottom of FIG. I, the parity bit value of $P_O$ will be the parity sum of the bit at line $K_{10}$ and the bit at line $K_{20}$ and the bit at line $K_{30}$--- and the bit at line $K_{mO}$.

Similarly, the parity bit at $P_1$ will be the parity sum of the bit on line $K_{11}$ and the bit on line $K_{21}$ and the bit on line $K_{31}$ and the bit on line $K_{ml}$.

Thus, in reference to FIG. 1, there was seen a set of equations by which the program parity bits are determined for the memory $20_p$. As seen in these equations, the sum of all the digital data bits on each corresponding line such as line $K_{10}$, $K_{20}$, ------- and so on through $K_{mO}$ ------ will provide a digital data bit called the parity bit designated $P_0$.

Likewise, each one of the corresponding lines such as $K_{11}$ and $K_{21}$ and $K_{31}$ etc. until $K_{ml}$ ------ will provide a series of digital data bits whose sum will be determinative of the PROM digital data bit designated as $P_1$.

These parity bits in the chip $20_p$ should be programmed as odd parity. When a comparison is made with the outputs of the ROM parity chip $20_p$, which are compared with the outputs of gates 30 thru 33, it will be seen that, any discrepancy that has occurred, will show up in the outputs of gates 40 thru 43 and will be reflected as a parity error signal by OR gate 50.

The disclosed system and circuitry will be seen to generate multiple parity bits for each data word, the number of bits being equal to the width of bits in each of the memory chips used.

As indicated previously, when the ROM or the PROM is programmed, a parity bit will be seen to be generated into the additional parity chip $20_p$. Thus since the wide memory structure can provide 1,024 locations of 4 bits each, then the parity memory chip $20_p$ provides 1,024 locations and carries a parity bit for each one of the 4 bit lines at each one of the 1,024 locations.

Thus when a word is read out during the READ operation, the parity bits for the data which is read out will be generated to duplicate the programmed parity bit which was initially placed into the additional parity chip $20_p$.

Thus when each of these newly generated parity bits from the read-out data are compared separately, bit by bit, with the corresponding pre-programmed parity bits that had been placed into the additional parity chip, then a comparison can be made using the Exclusive OR gates to see whether or not there was a parity error in the word that was read out.

If there was a parity error, then any single chip failure would be detected and indicated by the parity error signal from OR gate 50.

While a preferred embodiment of the described parity scheme for wide ROM/PROM memory chips has been described, it should be understood that other embodiments may be emcompassed by the inventive concept as defined in the following claims.

What is claimed is:

1. A parity checking system for checking the integrity of data transferred into and read out of a ROM/PROM memory structure, the combination comprising:
    (a) a wide memory structure having a plurality of paralleled ROM/PROM memory chips wherein each of said memory chips is connected to an address bus for receiving addresses to a specific location in each memory chip and each memory chip includes:
        (a1) "k" output lines for read-out of data from said addressed specific location where "k" represents the width in bits of each ROM/PROM memory chip;
    (b) said address bus, connected to each one of said paralleled ROM/PROM memory chips, for addressing the same location in each of said memory chips;
    (c) an auxiliary ROM/PROM parity memory chip connected to said address bus and holding parity information at each addressed location, said parity memory chip including
        (c1) "k" parity output lines connected to a second gating means for transmitting "k" parity output signals;
    (d) a first gating means for providing "k" summation output signals, each of which sum the bit values of each of the corresponding output lines from each of said memory chips;
    (e) said second gating means for providing "k" parity error output signals by comparing each of said "k" summation output signals with each of said respective "k" parity output signals.

2. The combination of claim 1 wherein said plurality of paralleled ROM/PROM memory chips includes "m"

chips each of which is "k" bits wide, where "m" is an integer.

3. The combination of claim 1 wherein each addressed location of said parity memory chip contains appropriate parity data bits which correlate to the data bits residing in each corresponding addressed location in each of said "m" memory chips.

4. The combination cf claim 1 which includes:
   (a) third gating means for receiving said "k" parity error output signals from said second gates and for generating a parity error signal if a parity error occurs signifying that an inaccurate data bit or bits were read out from the said memory structure.

5. The combination of claim 1 wherein said first gating means includes:
   (a) a first set of "k" Exclusive OR (XOR) gates wherein each of said gates includes:
      (a1) "k" input connection means for receiving the output bit values of each corresponding output line of each of said plurality of memory chips;
      (a2) means to generate a first summation output signal which sums the said bit values for transmission to said second gating means.

6. The combination of claim 5 wherein said second gating means includes:
   (a) a second set of "k" Exclusive OR (XOR) gates wherein each of said gates includes:
      (a1) means to receive the respective corresponding first summation output signal from said first gating means;
      (a2) means to receive the respective corresponding said parity output signal from said parity memory chip;
      (a3) means to generate a corresponding parity error output signal after comparing the corresponding said summation output signal and said parity error output signal.

7. A parity checking system for determining integrity of data read-out from a wide memory structure made of a plurality of ROM/PROM memory chips, comprising in combination;
   (a) a wide memory structure having "m" memory chips operating in parallel each of said memory chips having a width of "k" bits and wherein each of said memory chips include:
      (a1) "k" corresponding output bit lines for read-out of data stored in an addressed location in each of said memory chips;
      (a2) the same number of storage locations for data storage and the same address for each corresponding storage location in each of said "m" memory chips;
   (b) addressing means for addressing the same corresponding location in each of said plurality of ROM/PROM memory chips;
   (c) enabling means for enabling the read-out of data bits from each addressed location in each of said plurality of ROM/PROM memory chips, and from each corresponding addressed location in an auxiliary parity memory chip;
   (d) a series of "m" line groups wherein each line group consists of "k" data bit lines for carrying data read-out of each of said memory chips;
   (e) said auxiliary ROM/PROM parity memory chip memory chip duplicates the addressable storage locations of each of said "m" memory chips and is connected to receive addresses from said auxiliary addressing means, said parity memory chip including:
      (e1) parity data bits stored in each addressable location, which establish a parity signal for each set Of data and said corresponding locations in each one of said "m" memory chips;
      (e2) "k" output bit lines corresponding to said "k" output bit lines of each of said "m" memory chips;
   (f) parity data sensing means for summing data bits read-out from said memory structure for comparison with parity data bits read-out of said corresponding "k" bit lines of said auxiliary ROM/PROM parity memory chip in order to determine whether a parity error has occured.

8. The combination of claim 7 wherein said parity data sensing means includes:
   (a) a first set of "k" exclusive OR gates wherein each one of said exclusive OR gates sums the corresponding output bit line from each of said memory chips to provide a first set of "k" output signals to a second set of "k" exclusive OR gates.
   (b) said second set of "k" exclusive OR gates wherein each of said gates receives the respective outputs of said first set of exclusive OR gates and additionally compares them with the corresponding "k" outputs of said auxiliary ROM/PROM parity memory chips to generate "k" parity error output signals.

9. The combination of claim 8 which includes:
   (a) means to receive said "k" parity error output signals to sense any discrepancy which signifies a parity error in the data bits read out of any addressed location in any of said "m" memory chips.

10. The combination of claim 8 which includes:
    (a) an OR gate connected to receive said "k" parity error output signals and to generate a parity error bit should any parity error output signal indicate an inaccurate data bit being transferred out of an addressed location in any of said "m" memory chips.

11. In a wide structured ROM/PROM memory having "m" units of parallel memory chips wherein each memory chip has "m" units of address bit lines and has "k" corresponding output data bit lines such that there are "2m" locations for storage of "k" bits in each said memory chip and whereby each one of said 2 m locations can be addressed for read-out of data, a parity checking system, comprising in combination:
    (a) first means for summing the data bits of each one of said "k" corresponding output data bit lines of each one of said memory chips after moment of address occurrence and during read-out of each data bit in each addressed location in each of said memory chips, to generate a first set of "k" data bit outputs for conveyance to a second means for summing;
    (b) an auxiliary ROM/PROM memory parity chip, also addressed by said address lines, for storing parity dat. for each corresponding location addressed in each said "m" memory chips of said wide memory structure, and including "k" parity output data bit signals for transmittal to said second means for summing;
    (c) said second means for summing, connected to receive said first set of "k" data bit outputs and to receive said "k" parity data bit signals, in order to sense any parity descrepancy in any data read out on any bit line in any addressed location in any one of said "m" memory chips, said second means for summing including:

(c1) means to generate "k" parity error signals.

12. The combination of claim 11 which includes:

(a) OR gate means for receiving said "k" parity error signals from said second means for summary and including:

(a1) means to generate a parity error/no parity error output signal.

* * * * *